(12) United States Patent
Bigo et al.

(10) Patent No.: US 6,412,809 B1
(45) Date of Patent: Jul. 2, 2002

(54) FOLDING PUSH CHAIR FOR A CHILD WITH MEMORY OF THE ANGLE OF INCLINATION OF THE HAMMOCK

(75) Inventors: Jean Bigo; M. Laurent Ageneau, both of Cholet (FR)

(73) Assignee: Ampafrance, Cholet Cedex (FR)

( * ) Notice: Subject to any disclaimer, the term of this patent is extended or adjusted under 35 U.S.C. 154(b) by 0 days.

(21) Appl. No.: 09/346,974

(22) Filed: Jul. 2, 1999

(30) Foreign Application Priority Data

Jul. 8, 1998 (FR) .............................. 98 08965

(51) Int. Cl.$^7$ ................................. B62B 3/02
(52) U.S. Cl. ........................ 280/642; 280/650
(58) Field of Search ................ 280/42, 642, 644, 280/647, 649, 650, 657, 658, 47.38, 47.4, 47.39; 403/101, 102

(56) References Cited

U.S. PATENT DOCUMENTS

| | | | |
|---|---|---|---|
| 4,335,893 A | * | 6/1982 | Carmichael et al. .......... 280/42 |
| 4,335,900 A | * | 6/1982 | Fleischer .................... 280/649 |
| 4,344,649 A | * | 8/1982 | Fleischer .................... 297/30 |
| 4,915,401 A | * | 4/1990 | Severson et al. ............. 280/30 |
| 5,074,575 A | | 12/1991 | Bigo ......................... 280/642 |
| 5,622,377 A | * | 4/1997 | Shamie ....................... 280/642 |
| 5,669,624 A | * | 9/1997 | Eichhorn ..................... 280/642 |
| 5,669,625 A | * | 9/1997 | Cabagnero ................. 280/647 |
| 5,988,670 A | * | 11/1999 | Song et al. ................. 280/648 |

FOREIGN PATENT DOCUMENTS

| | | |
|---|---|---|
| DE | 38 38 925 | 5/1989 |
| EP | 0 339 890 | 11/1989 |
| FR | 2 617 110 | 12/1988 |

* cited by examiner

Primary Examiner—Brian L. Johnson
Assistant Examiner—Bridget Avery
(74) Attorney, Agent, or Firm—Merchant & Gould PC

(57) ABSTRACT

A folding push chair for a child with memory of the angle of inclination of the seat. The folding push chair may have a push chair chassis including two front struts, two pushing arms adapted to slide along the two front struts such that the chassis is foldable between a folded position and a deployed position, and stops, cams, and a link. In addition, a hammock may be disposed on the chassis, the hammock having a first fixing element, the chassis having a second fixing element, the first and second fixing elements cooperating to attach the hammock to the chassis, wherein the first fixing element has a pin and a slide for adjusting an angle of inclination of the hammock such that the hammock is adjustable between at least two inclination positions with respect to the first fixing element independently of a position of the chassis. The pin arid slide slot may be adapted to retain a selected inclination position when the chassis is in the folded position, such that the hammock is directly in the selected inclination position when the push chair is unfolded into the deployed position, and wherein the second fixing element cooperates with the stops, cams, and link.

6 Claims, 7 Drawing Sheets

FOLDING PUSH CHAIR FOR A CHILD WITH MEMORY OF THE ANGLE OF INCLINATION OF THE HAMMOCK

TECHNICAL FIELD

The field of the invention is that of child care and in particular push chairs for children. More precisely, the invention relates to a folding push chair for a child, the hammock of which can be inclined and has a variable seating angle as a function of its angle of slope.

BACKGROUND

Numerous inclinable push chairs with a hammock or a slung seat are already known. Usually, the hammock is mounted on the chassis of the push chair. Various means are provided, on the chassis, to guide, position and keep the hammock in place in the desired position.

A known improvement consists of varying the opening angle of the seat of the hammock, as a function of its inclination. Hence when the hammock is in a substantially upright position (seated position), the angle of the seat (angle formed by the seating element and the back part of the hammock) is of the order of 110°, in such a way as to form an easy chair with a back. Conversely, when the hammock is in a stretched out position, the angle formed by the seat of the hammock opens up (of the order of 160°). Therefore, the child is comfortably seated when the hammock is in the sitting position and is stretched out when the hammock is in the stretched out position. Of course intermediate positions can also be provided.

A disadvantage of push chairs with a hammock the slope of which can be adjusted of whatever kind is that they are not very easy to fold. It is well known that ease of handling of child care equipment in general and folding push chairs in particular is an essential objective.

Numerous solutions have been proposed which allow one to provide practically automatic folding and unfolding or which at the very least only require a very reduced number of simple actions, whilst of course, at the same time responding to safety needs.

Nevertheless, it still remains necessary prior to folding, to bring the hammock back to a standard inclination. If this is not done then either folding is not possible or the hammock forms a large angle with the folded chassis which is not compatible with the requirement to make the folded push chair occupy a small space.

This adds an extra action when unfolding the push chair since the hammock returns systematically to the standard inclination, while generally speaking the user wishes to return to the previous inclination of the state of the art.

SUMMARY

The purpose of the invention is notably to remedy these disadvantages.

More precisely, an objective of the invention is to provide a folding push chair with a hammock with adjustable inclination, the folding up of which requires no additional operation whatsoever, compared with a push chair with a fixed hammock, whatever the inclination of the hammock.

Another objective of the invention is to provide such a push chair, the unfolding of which allows one to return to the previous angle of inclination of the hammock in an automatic way.

A particular objective of the invention is to provide, in one embodiment, a push chair, the hammock of which is reversible, that is to say positioned so that the child is facing the route ahead (in the direction the push chair is moving) or facing the person who i s pushing the push chair (direction opposite to the direction of the travel of the push chair).

Of course, another objective of the invention is to provide such a push chair, the size of which in the folded position is not modified by the implementation of the new functions.

Yet another objective of the invention is to provide such a push chair, in which the new functions do not lead to a large increase in cost nor a great increase in the weight of the push chair, in the number of components used or in the complexity of manufacture of the components or of their assembly.

Hence the invention relates to a folding push chair for a child, of the type comprising an inclinable hammock mounted on the chassis of the push chair, having two pushing arms that can slide in such a way a s to allow folding respectively along two front struts, the fixing of the hammock onto the chassis being provided by co-operation between first fixing means mounted on said hammock and second fixing means mounted on said chassis.

By hammock, here one understands the sling that receives the child and its means of support (fastening, stiffening members etc.)

According to the invention, the first means of fixing carry means of adjusting the inclination of said hammock, and said second means of fixing co-operate with locking means such that:

when said chassis is in the deployed position, said second means of fixing are held in a single fixed position;

when said chassis is in the folded position, said second means of fixing are free to rotate, in accordance with an axis perpendicular to said front struts and parallel to the plane formed by the folded chassis, over a predetermined range of rotation, in such a way that said hammock can arrive substantially in the plane formed by said folded chassis, over a predetermined range of rotation.

Hence the operations of inclining and of folding are dissociated from one another : the inclining is linked to the hammock and the folding to the chassis. The hammock and the elements that it carries, are not modified during the folding operation. Hence the effect of memorizing the inclination is provided, the hammock automatically once again taking up the inclination it previously had.

No special handling is required either for folding or for unfolding compared with the prior technique.

In an advantageous way, the first fixing means can be integrated with the second fixing means in two separate ways, it being possible to position the hammock so that the child being transported is facing the front or the back in relation to the direction of travel of the push chair.

In effect, the invention is particularly applicable to the case where the hammock is reversible (which, according to known techniques, requires extensive and not very convenient handling operations).

Preferably, said range of rotation covers an angle of at least 60° and generally much more, notably in the case of reversible hammocks.

According to a first embodiment of the invention, said locking means comprise at least one link, one end of which is mounted on a rear strut of said chassis and a second end is mounted on said second fixing means.

Hence the new function of the invention is ensured in a particularly simple and inexpensive way and is very effective.

Advantageously, said single fixed position of said second fixing means is defined by at least one stop created on said chassis which cooperates with a cam provided for this purpose on said second fixing means.

Notably the device can be fitted with an upper stop, created on said pushing arms, and a lower stop created on the corresponding front strut.

Other means can also be considered such as pins that co-operate with slots.

According to a second embodiment, said locking means comprise at least one link, one end of which is mounted on one of the support elements and the second end is movable parallel to said front struts and to said pushing arms.

Advantageously, said link is mounted on a component that slides between the strut and the pushing arm.

Once again, operation of the device is very simple.

In a preferred way, in the deployed position, said sliding component comes into contact with a guide and support sleeve for one of said struts and the corresponding pushing arm.

The description given above, essentially refers to just one side of the push chair. However, although in certain cases one might consider non-symmetrical means of operation, a push chair according to the invention advantageously comprises similar fixing means on each of its two ideas.

DESCRIPTION OF THE DRAWINGS

Other characteristics and advantages of the invention will more clearly become apparent on reading the description which follows of two preferred embodiments of the invention, given by way of simple illustrative and non-limitative examples with the appended drawings in which.

DETAILED DESCRIPTION

As previously stated, the invention relates to a technique that allows easy and effective folding up of a push chair for a child, at the same time memorizing the angle of inclination of the hammock in such a way that the latter automatically takes up its previous angle of inclination, when the push chair is unfolded again.

The invention relies notably on the separation of two functions: the inclining function provided by the fixing elements mounted on the hammock and the folding function and more precisely the locking and unlocking function provided by the fixing elements of the hammock and the chassis which co-operate in their main function of rigidly attaching the hammock to the chassis. Advantageously, they are designed so that the position of the hammock on the chassis is reversible.

A first embodiment of the invention is illustrated in FIGS. 1 to 3C.

Figure 1:
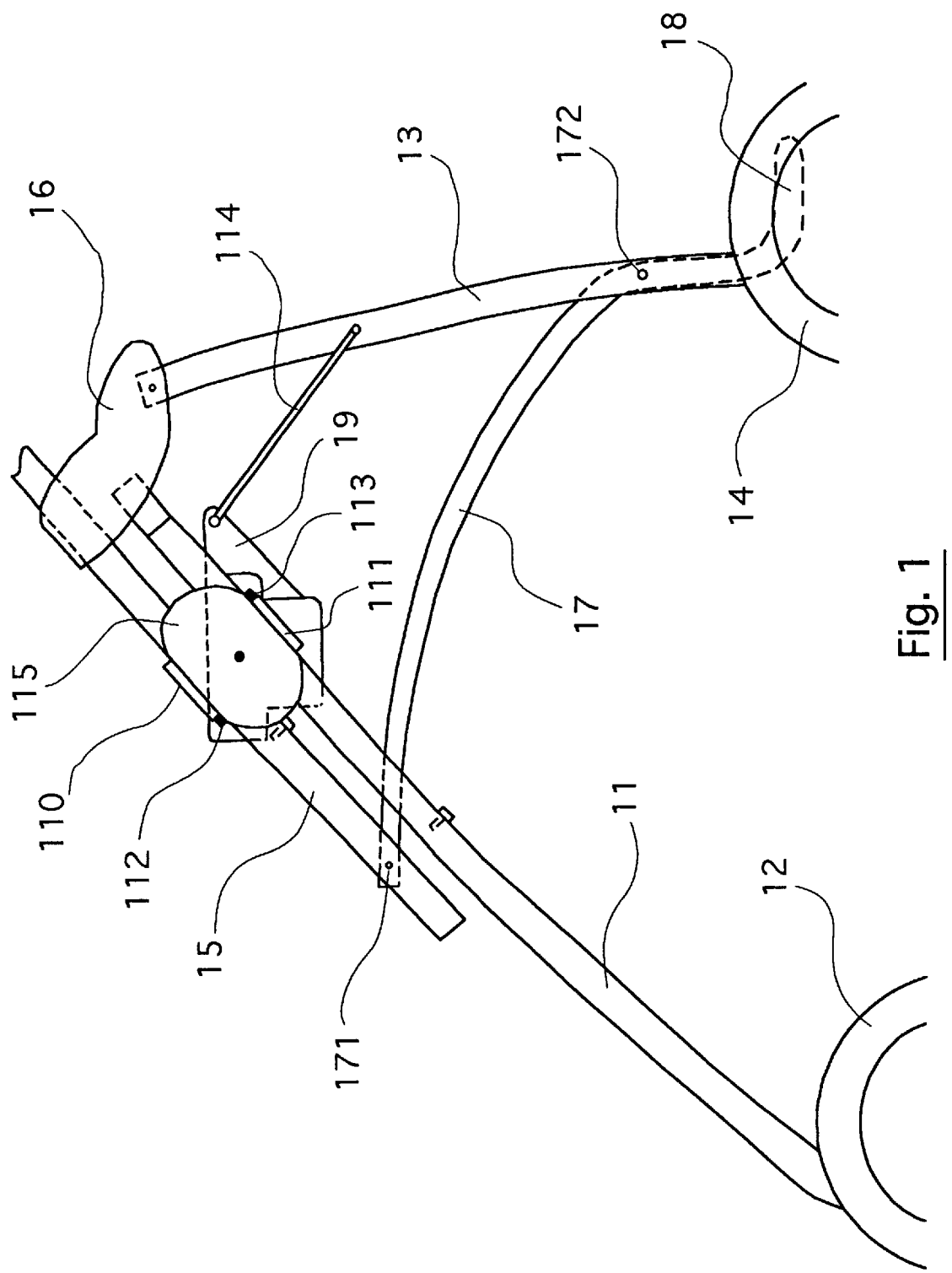
FIG. 1 illustrates, in a partial way, the chassis of a push chair according to a first embodiment of the invention, in the unfolded position.

FIG. 1 shows the chassis of the push chair, in the unfolded or deployed position, seen from the side.

It should be noted that all the Figures show elements viewed from the side. It is clear that, preferably both sides of the push chair are symmetrical, and that the same elements are to be found on each side providing the same functions.

In FIG. 1, the front strut 11 can be seen, supporting one or more wheels 12, the rear strut 13 supporting one or more wheels 14 and the pushing arm 15.

These three chassis elements are connected by a connecting member 16 on which:

the top end of the front strut 11 is held in fixed fashion the top end of the rear strut 13 is mounted in articulated fashion in such a way that it can become parallel to the front strut when being folded;

the pushing arm is slidably mounted.

A cross member 17, which can be extended by a foot rest 18, connects the pushing arm 15 and the rear strut 13 through two articulations 171 and 172.

The element 19 that attaches the hammock is mounted in articulated fashion on a slide 115 sliding on the pushing arm 15 and the front strut 11. It is held in a single fixed unfolded position (upper part horizontal) by means of two stops 110 and 111, mounted on the slide (or double slide) 115, which co-operate with cams 112 and 113 fitted for this purpose on fixing element 19. According to another embodiment, a single stop and a single cam can be fitted.

It has been brought into this position during unfolding, by the link 114, articulated on the one hand on the fixing element 19 and on the other hand on the rear strut 13.

Figure 2A:
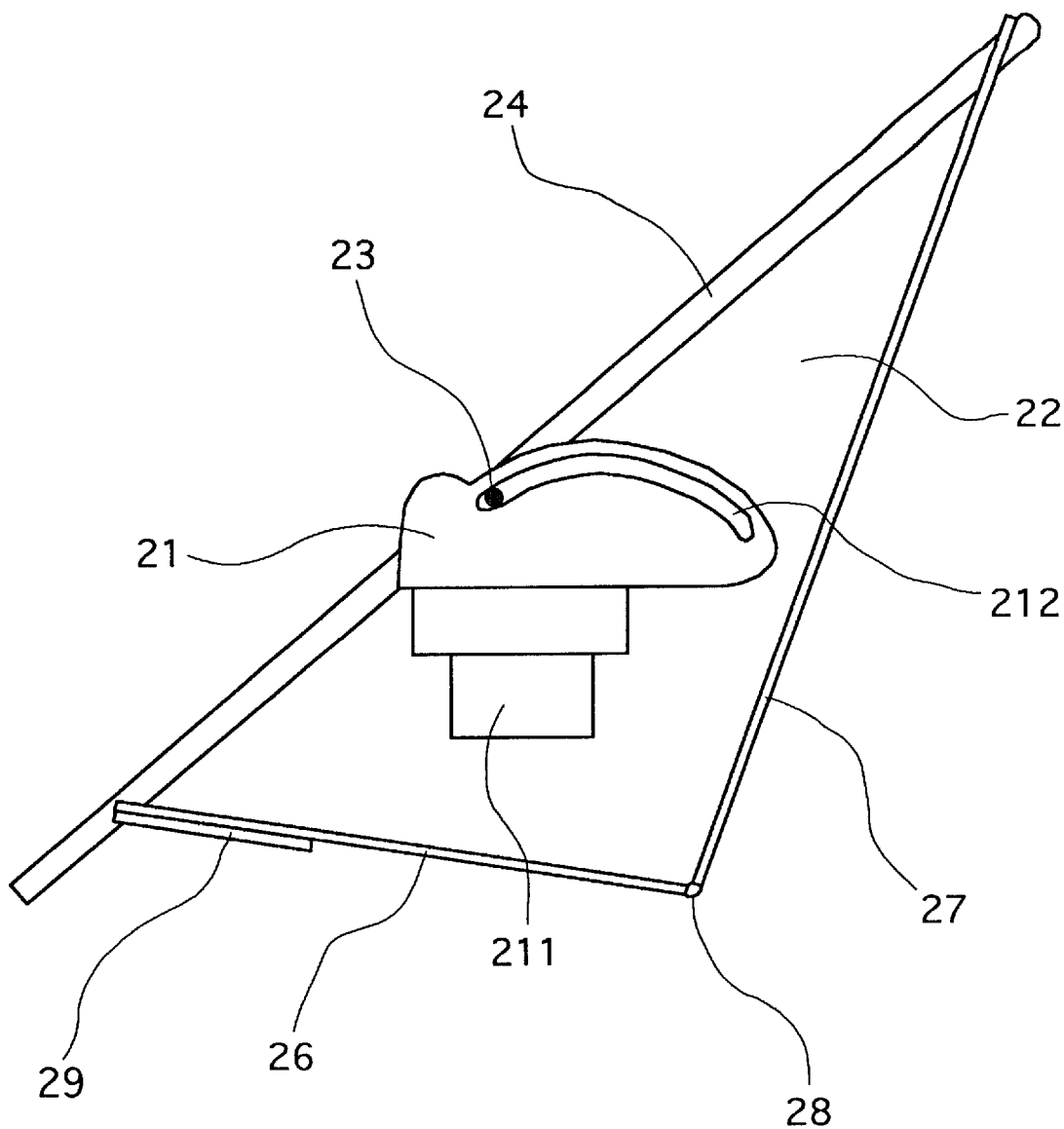
FIGS. 2A to 2C shows, diagrammatically, three of the positions that the hammock can take up on the chassis of FIG 1.
Figure 2B:
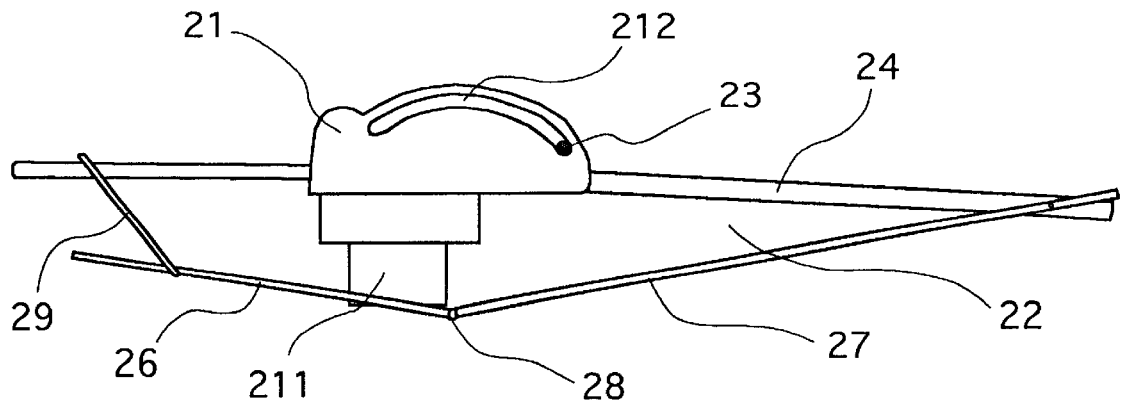
Figure 2C:
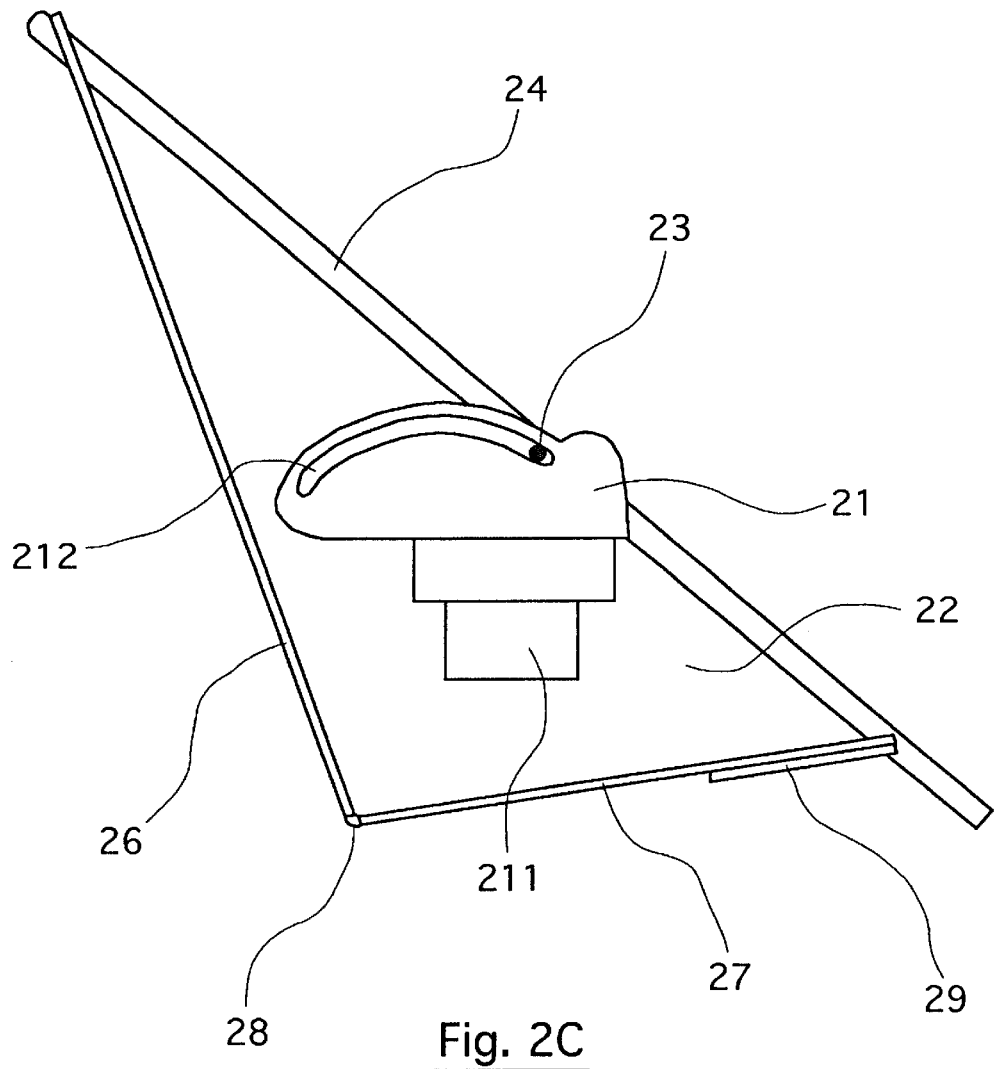

The hammock comprises a second fixing element 21, that complements the fixing element 19 and that can be seen in FIGS. 2A to 2C. This second fixing element 21 comprises a lower part 211 that registers in the fixing element 19 of the chassis in such a way that the hammock 22 is easily and solidly located and held. An embodiment of this technique is described in Patent Application FR-2 753 159 included as a reference.

The mechanism for inclining the hammock is exclusively carried by the hammock and more precisely by the fixing element 21, independently of the chassis. As illustrated in FIGS. 2A and 2B, it can for example comprise a slide slot 212, in which a pin 23 moves, the pin being mounted on the hammock 22 and more precisely on the brace 24. Catches or some other mechanism are fitted in order to hold the hammock at the desired angle of inclination between the seated position as illustrated in FIG. 2A;

the stretched out position as illustrated in FIG. 2B.

This inclination system is like that described more precisely in Patent Application FR-98 00820, included as a reference.

According to this technique, the angle of opening of the seat of the hammock is varied as a function of its angle of inclination. Hence when the hammock is in its substantially upright position (sitting position), the angle of the seat (the angle formed by the seat part and the back part of the hammock) is of the order of 110°, in such a way as to form an easy chair with a back. Conversely, when the hammock is in the stretched out position, the angle formed by the seat of the hammock opens out considerably (of the order of 160°). Hence the child is comfortably seated when the hammock is in the sitting position and stretched out when the hammock is in the stretched out position. Of course intermediate positions can also be provided.

In order to obtain this result, the hammock has, viewed from the side, the structure of a deformable triangle. The hypotenuse of this triangle is formed by the brace 24 of the hammock. The two other sides (the seat part and the back part) are two stiffening elements 26 and 27 (usually panels of plastic material) articulated at their common summit 28. The brace is designed in such a way that its length can be varied. Varying its length automatically causes the opening and the closing of the angle formed by the seat part and the back part. An additional element of articulation 29 can be provided.

More precisely, in the sitting position, the brace has its minimum length, and in the stretched out position, its maximum length. For this, the brace is designed in two parts, an upper part and a lower part, the upper part being able to telescopically go into a portion of the lower part.

Furthermore the connecting members 19 and 21 are designed in such a way that the hammock is reversible in relation to the chassis as illustrated in FIGS. 2A and 2C.

Figure 3A:
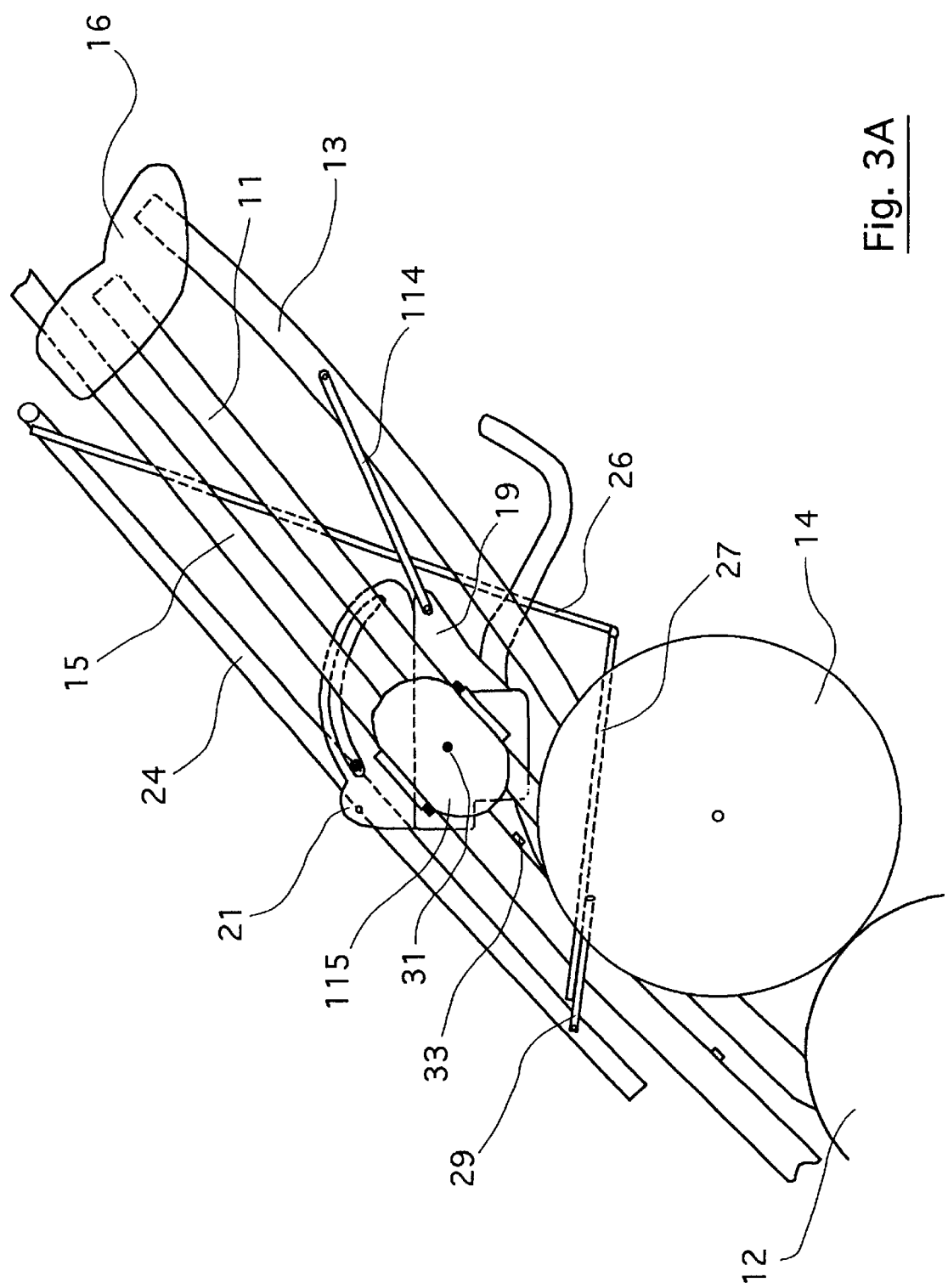
FIGS. 3A and 3C illustrate the chassis of FIG. 1, in the folded position, in which the hammock is respectively in the positions of FIGS. 2A to 2C.
Figure 3B:
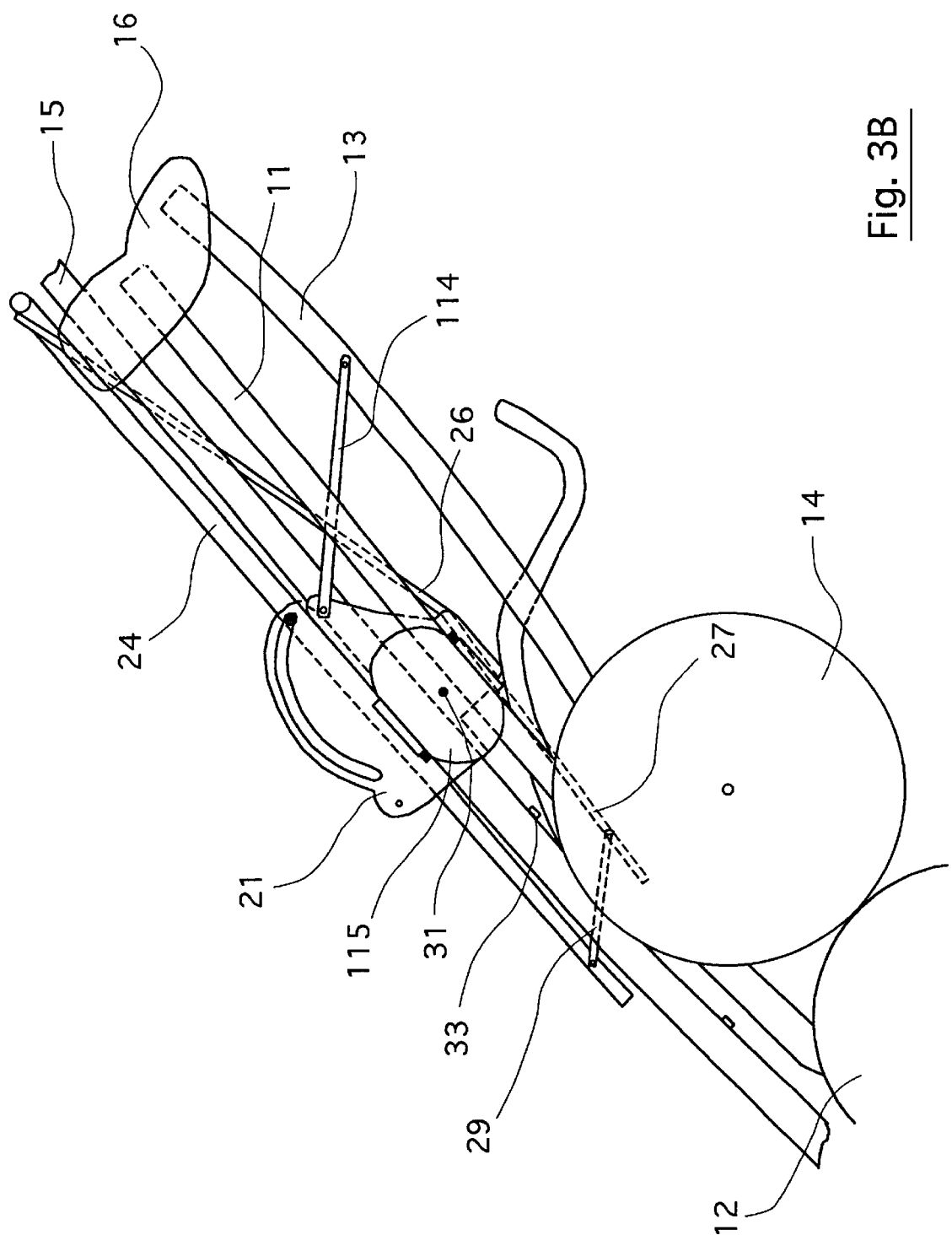
Figure 3C:
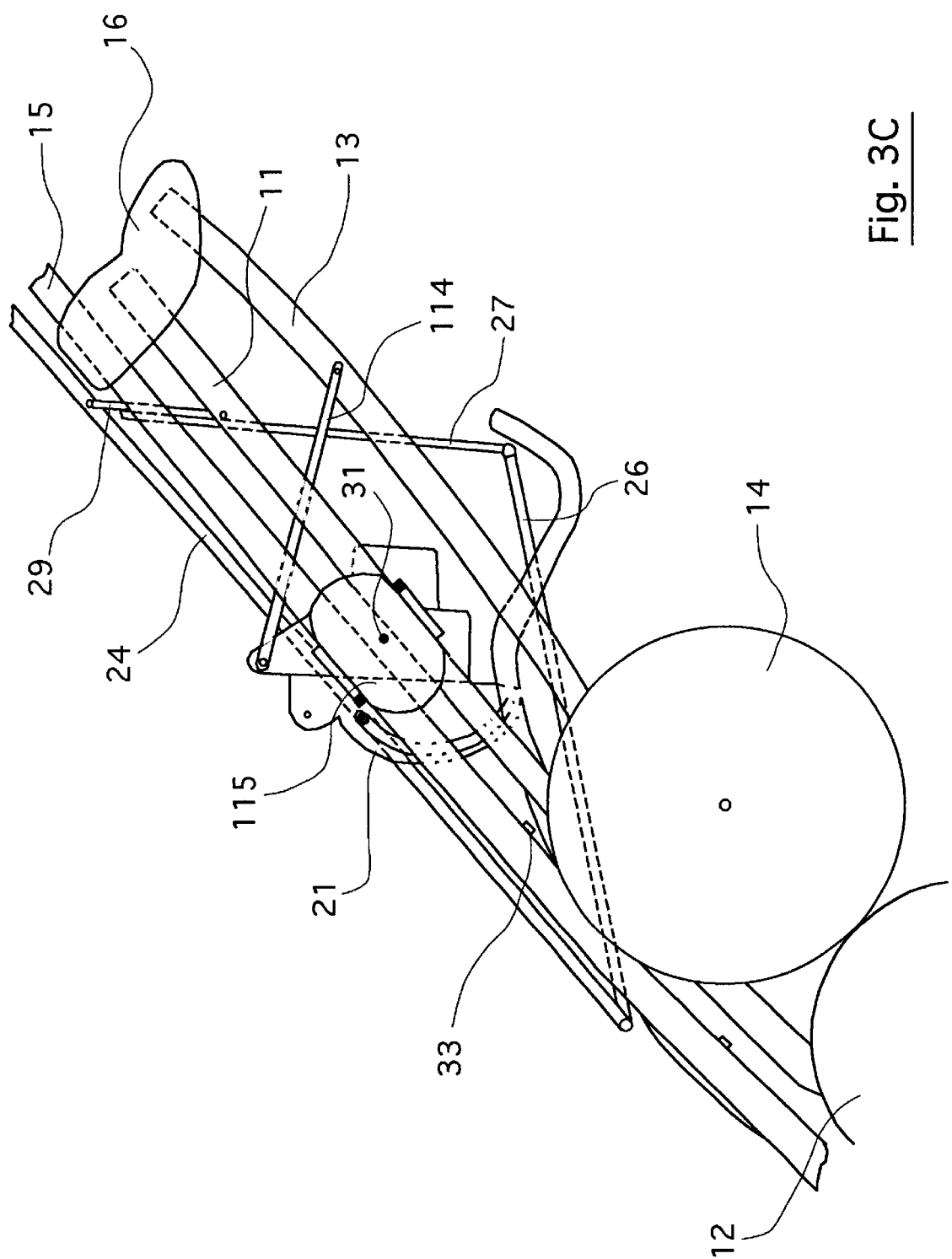

When the chassis is folded, the pushing arm 15 slides along the front strut 11 and the rear strut 13, moved by the cross member 17, and arrives in a position parallel to the front strut 11 as is illustrated in FIGS. 3A and 3C.

The link 114 moves the fixing element 19 by sliding along the pushing arm 15 and the front strut 11 towards the front wheel 12.

This movement releases the fixing element 19 which is no longer held by stops 110 and 111. Consequently it can freely pivot about its axis 31, within the limits permitted by the link 114. As is apparent in the three FIGS. 3A to 3C, this rotation covers a very large angle, greater than 60°, in order to ensure effective folding of the push chair whatever the direction of the inclination of the hammock.

This effective folding is provided when the upper part 24 of the frame of the hammock (corresponding to the brace of the hammock) is parallel or substantially parallel to the plane defined by the front strut 11. The hammock takes up this position naturally during the folding (in certain cases and with certain embodiments a final manual positioning might be necessary).

FIGS. 3A to 3C illustrate the folded push chair in the three hammock positions in FIGS. 2A to 2C. It should be noted that in the case of FIG. 3C where the hammock is in the position facing outwards the fixing element 19 does not slide as far towards the front wheel 12. Hence, the volume in the folded position remains restricted to its minimum. In other words, the hammock positions itself in relation to the chassis in such a way that it does not go beyond either the pushing arms or the wheels and therefore the length in the folded position remains restricted to that imposed by the chassis.

It should be noted on these Figures that the link 114 can be rotatably moved in relation to the rear strut 13, which allows the fixing element 19 to pivot around its axis 31, attached to the slide 115. When the push chair is unfolded, this slide 115 (supporting the fixing element 19) is displaced by the sliding of the pushing arm 15 towards the connecting component 16 by means of a stop 33.

At the same time, under the action of the link 114, itself moved by the rear strut 13, the slide 115 is brought back to its fixed position (FIG. 1), up to the point where the cams 112 and 113 come into contact with the stops 110 and 111.

The inclination setting having been maintained by the fixing element 21 (the position of the pin 23 in relation to the slot 212) during folding, the hammock will automatically return to its previous angle of slope, without any particular manipulation being required either during the folding or the unfolding.

Figure 4A:
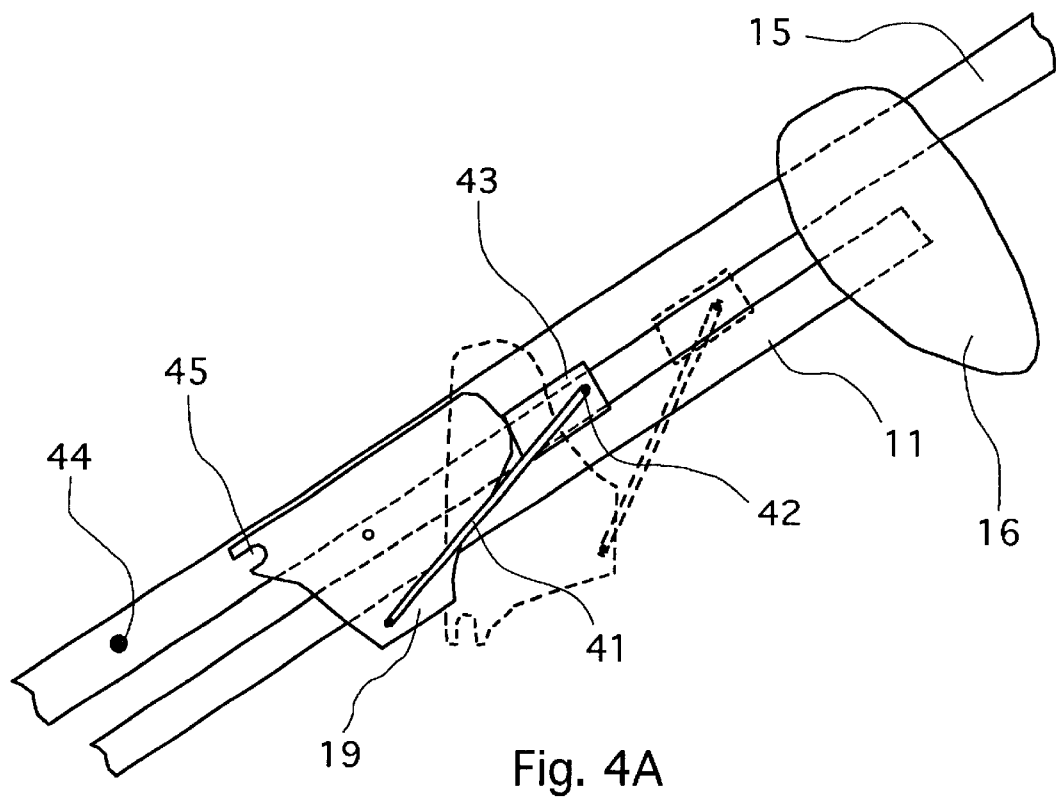
FIGS. 4A and 4B show the locking mechanism and the mechanism for memorizing the position of the hammock, when the hammock is respectively unfolded and folded.
Figure 4B:
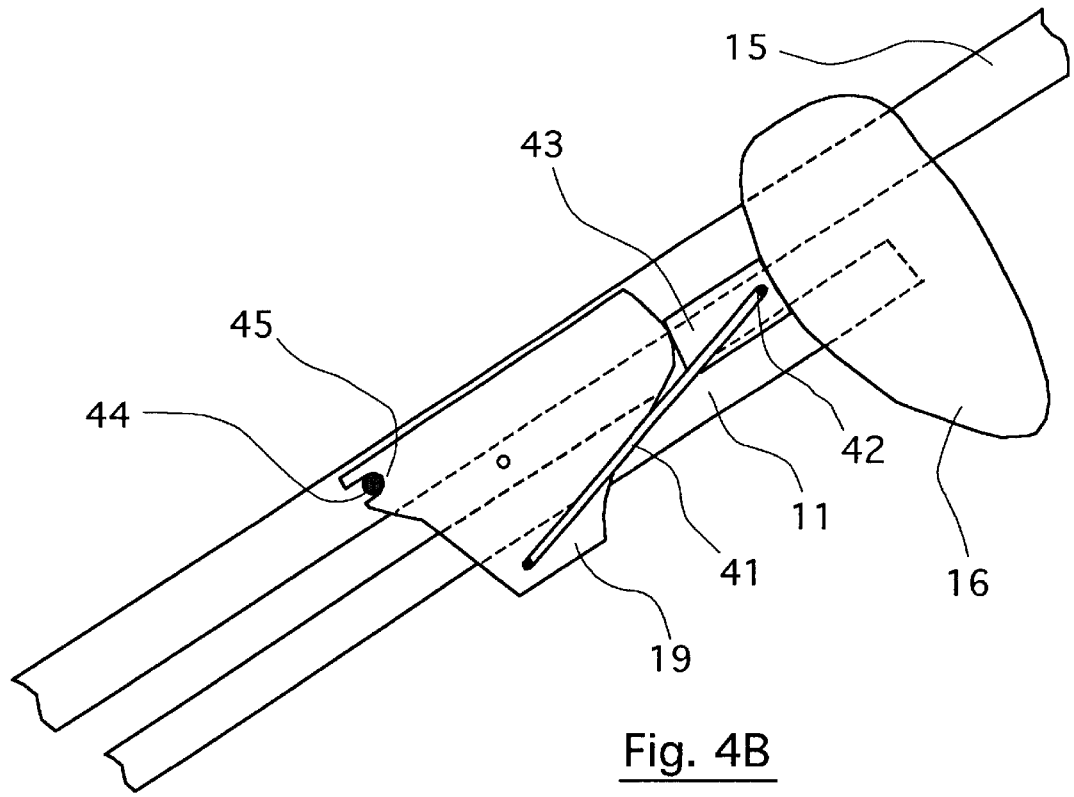

FIGS. 4A and 4B illustrate a second embodiment of the invention.

In this second embodiment, the fixing elements are similar to those described previously, only guide and locking means being different. Therefore only these have been illustrated.

According to this second embodiment, the locking/unlocking link 41 of the fixing element 19 has one end 42 no longer mounted on the rear strut but on a component 43 that slides between the pushing arm 15 and the front strut 11, over a portion defined by the connecting component, or sleeve 16 and the slide 115 which carries the fixing element 19. Of course according to other embodiments this component can follow the same movement by sliding on the pushing arm 15 and/or on the front strut 11.

In the position with the chassis unfolded as illustrated in FIG. 4B, the sliding component 43 comes into contact with the connecting component 16, and is held by the slide 115, which carries the fixing element 19. It cannot therefore slide. The link 41 has moved the slide 115 (and therefore the fixing element 19) into its single fixed position.

The latter is held safely in this fixed position with the help of a pin 44 mounted on the pushing arm 15 which co-operates with a slot 45 provided for this purpose in the connecting member. Other means of blocking movement can be considered of the type similar to the stops and cams described in the context of the first embodiment. Conversely, such a pin can be used in the first embodiment.

In the folded position, illustrated in FIG. 4A, the pushing arm distances the fixing element 19 from the connecting component 16. The sliding component 43 can then move freely between them. The pin 44 is released from the slot 45 which permits the fixing element 19 to move in rotation relative to the slide 115 about its axis, over an angular range corresponding to the range of displacement of the sliding component 43. A first position, corresponding to the hammock in the sitting position is illustrated with continuous lines. A second position corresponding to the hammock in the lying down position is shown in dotted lines.

The principle of operation is therefore the same as that described above. In the folded position, the hammock can move into a plane parallel to the front struts and to the pushing arms. During unfolding, it takes up its previous angle of slope.

What is claimed:

1. A folding push chair, comprising:
a push chair chassis comprising two front struts, two pushing arms adapted to slide along said two front struts such that said chassis is foldable between a folded position and a deployed position, and locking means, a hammock disposed on said chassis, said hammock comprising first fixing means, said chassis comprising second fixing means, said first and second fixing means cooperating to attach said hammock to said chassis, wherein said first fixing means comprise adjusting means for adjusting an angle of inclination of said hammock such that said hammock is adjustable between at least two inclination positions with respect to said first fixing means independently of a position of said chassis, said adjusting means being adapted to retain a selected inclination position when said chassis is in the folded position, such that said hammock is directly in said selected inclination position when the push chair is unfolded into said deployed position, wherein said locking means comprises at least one stop disposed on said chassis and a cam disposed on said second fixing means, said at least one stop cooperating with said cam to hold said second fixing means fixed with respect to said first fixing means when said chassis is in said deployed position and wherein said second fixing means cooperate with said locking means such that:
when said chassis is in said deployed position, said locking means hold said second fixing means fixed with respect to said first fixing means such that said hammock is maintained in one of said inclination positions, and when said chassis is in said folded position, said second fixing means are rotatable with respect to said first fixing means about an axis perpendicular to said front struts and parallel to a plane defined by said chassis when said chassis is in said folded position, over a predetermined range of rotation, such that said hammock is adapted to move substantially into said plane.

2. A folding push chair, comprising:

a push chair chassis comprising two front struts, two pushing arms adapted to slide along said two front struts such that said chassis is foldable between a folded position and a deployed position, and locking means, a hammock disposed on said chassis, said hammock comprising first fixing means, said chassis comprising second fixing means, said first and second fixing means cooperating to attach said hammock to said chassis, wherein said first fixing means comprise adjusting means for adjusting an angle of inclination of said hammock such that said hammock is adjustable between at least two inclination positions with respect to said first fixing means independently of a position of said chassis, said adjusting means being adapted to retain a selected inclination position when said chassis is in the folded position, such that said hammock is directly in said selected inclination position when the push chair is unfolded into said deployed position, wherein said locking means comprises at least one stop disposed on said chassis and a cam disposed on said second fixing means, said at least one stop cooperating with said cam to hold said second fixing means fixed with respect to said first fixing means when said chassis is in said deployed position and wherein said second fixing means cooperate with said locking means such that:

when said chassis is in said deployed position, said locking means hold said second fixing means fixed with respect to said first fixing means such that said hammock is maintained in one of said inclination positions, and when said chassis is in said folded position, said second fixing means are rotatable with respect to said first fixing means about an axis perpendicular to said front struts and parallel to a plane defined by said chassis when said chassis is in said folded position, over a predetermined range of rotation, such that said hammock is adapted to move substantially into said plane.

3. A push chair according to claim 2, wherein said at least one stop comprises an upper stop disposed on said pushing arms and a lower stop disposed on a corresponding front strut.

4. A push chair according to claims 1, 2, or 3 wherein said first fixing means and said second fixing means cooperate such that said hammock is reversible with respect to said chassis.

5. A push chair according to claims 1, 2, or 3, wherein said range of rotation is at least 60°.

6. A folding push chair, comprising:

a push chair chassis comprising two front struts, two pushing arms adapted to slide along said two front struts such that said chassis is foldable between a folded position and a deployed position, and locking means, a hammock disposed on said chassis, said hammock comprising first fixing means, said chassis comprising second fixing means, said first and second fixing means cooperating to attach said hammock to said chassis, said chassis comprising a rear strut, and said locking means comprise at least one link having first and second ends, said first end being mounted on said rear strut and said second end being mounted on said second fixing means, wherein said first fixing means comprise adjusting means for adjusting an angle of inclination of said hammock such that said hammock is adjustable between at least two inclination positions with respect to said first fixing means independently of a position of said chassis, said adjusting means being adapted to retain a selected inclination position when said chassis is in the folded position, such that said hammock is directly in said selected inclination position when the push chair is unfolded into said deployed position, and wherein said second fixing means cooperate with said locking means such that:

when said chassis is in said deployed position, said locking means hold said second fixing means fixed with respect to said first fixing means such that said hammock is maintained in one of said inclination positions, and when said chassis is in said folded position, said second fixing means are rotatable with respect to said first fixing means about an axis perpendicular to said front struts and parallel to a plane defined by said chassis when said chassis is in said folded position, over a predetermined range of rotation, such that said hammock is adapted to move substantially into said plane.

* * * * *